(12) United States Patent
Bibeault

(10) Patent No.: US 9,733,448 B1
(45) Date of Patent: Aug. 15, 2017

(54) FLEXURE-BASED FOCUS MECHANISM

(75) Inventor: Steven P. Bibeault, Mason, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 971 days.

(21) Appl. No.: 13/610,072

(22) Filed: Sep. 11, 2012

Related U.S. Application Data

(60) Provisional application No. 61/533,961, filed on Sep. 13, 2011.

(51) Int. Cl.
*G02B 7/09* (2006.01)

(52) U.S. Cl.
CPC ..................... *G02B 7/09* (2013.01)

(58) Field of Classification Search
CPC ............ G02B 26/0833; G02B 26/0841; G02B 26/085; G02B 26/0858; G02B 26/105; G02B 26/101; G02B 7/02; G02B 7/023; G02B 7/04–7/09; B81B 3/0083; B81B 3/0086; B81B 2201/04–2201/047; B81B 2203/04; G03B 3/00; G03B 3/10–3/12; G03B 13/32–13/36; H02K 41/0356; H04N 5/23212
USPC ......... 359/198.1–199.4, 200.6–200.8, 202.1, 359/221.2, 223.1–225.1, 226.2, 904, 359/290–295, 838, 846, 871, 872, 811, 359/819, 822–824; 250/204, 559.06, 250/559.29, 230, 234; 347/255–260; 353/39, 98–99; 385/15–18, 22; 398/12, 398/19, 45; 396/79–80, 144–145; 348/345, 357; 352/140
See application file for complete search history.

(56) References Cited

U.S. PATENT DOCUMENTS

| | | | | |
|---|---|---|---|---|
| 5,199,014 | A * | 3/1993 | Homburg | G11B 7/0932 359/814 |
| 5,442,167 | A * | 8/1995 | Cornelius | H04N 5/23212 250/201.2 |
| 5,734,490 | A * | 3/1998 | Rabarot | G02B 26/0875 359/210.1 |
| 2010/0091303 | A1* | 4/2010 | Brunner | G01D 5/24423 356/614 |

* cited by examiner

*Primary Examiner* — Stephone B Allen
*Assistant Examiner* — James McGee
(74) *Attorney, Agent, or Firm* — Finch & Maloney PLLC

(57) ABSTRACT

Techniques and architecture are disclosed for stabilizing optical/imaging componentry over a broad range of environmental conditions and stressors. A flexure-based focus mechanism provided using the disclosed techniques may help to minimize or otherwise reduce the effects of a wide variety of stressors (e.g., vibration, torque, thermal expansion/contraction, etc.), thus assisting with achieving and/or maintaining fine focus with an optical/imaging component. In some cases, such a mechanism can be: (1) operatively coupled with a given optical/imaging system component; and/or (2) integrated therewith. In some instances, an optional drive assembly may be implemented in conjunction with such a mechanism to assist with achieving and/or maintaining fine focus.

20 Claims, 13 Drawing Sheets

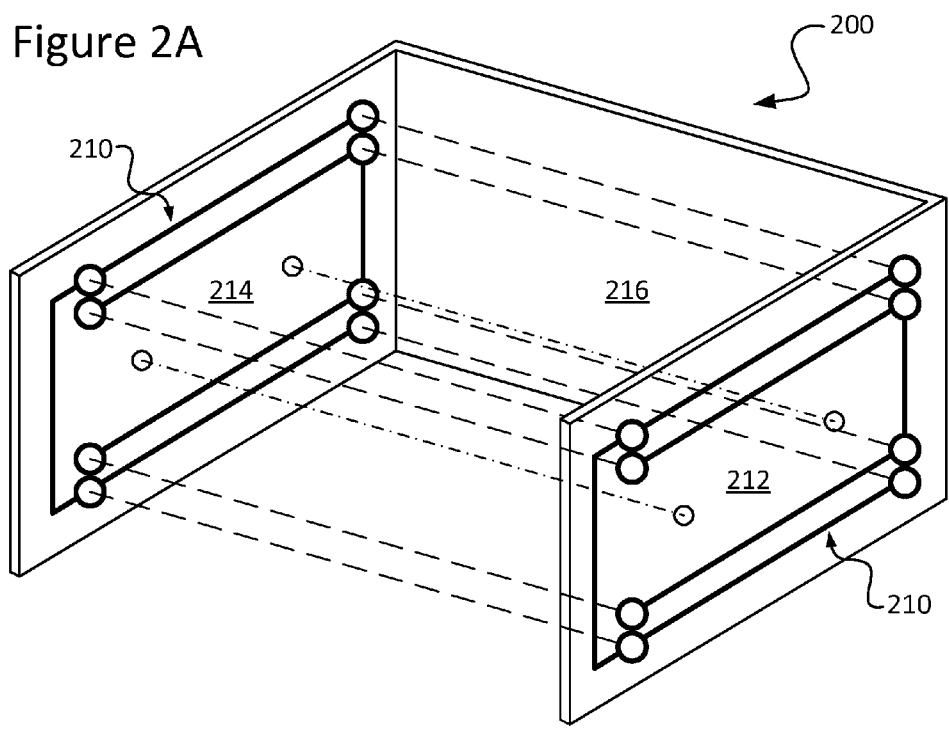
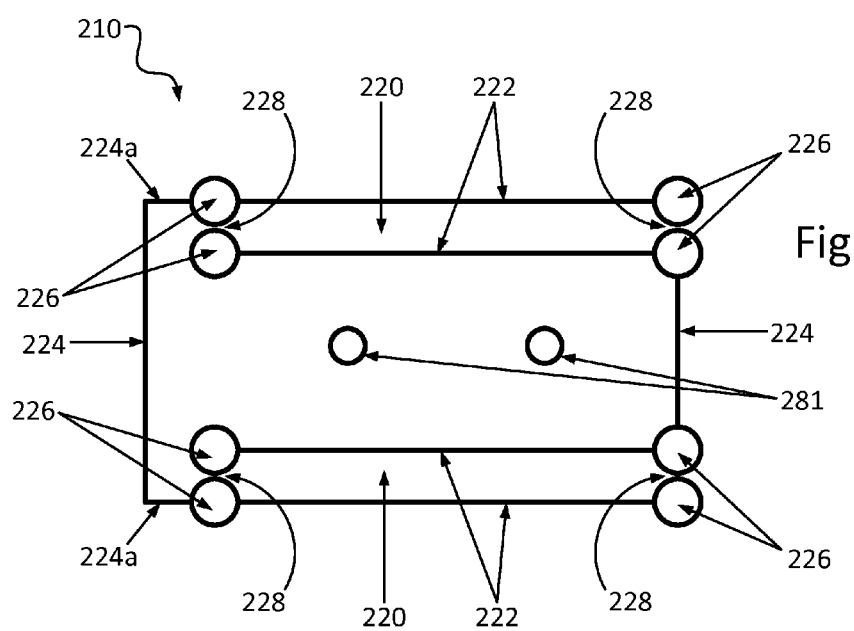

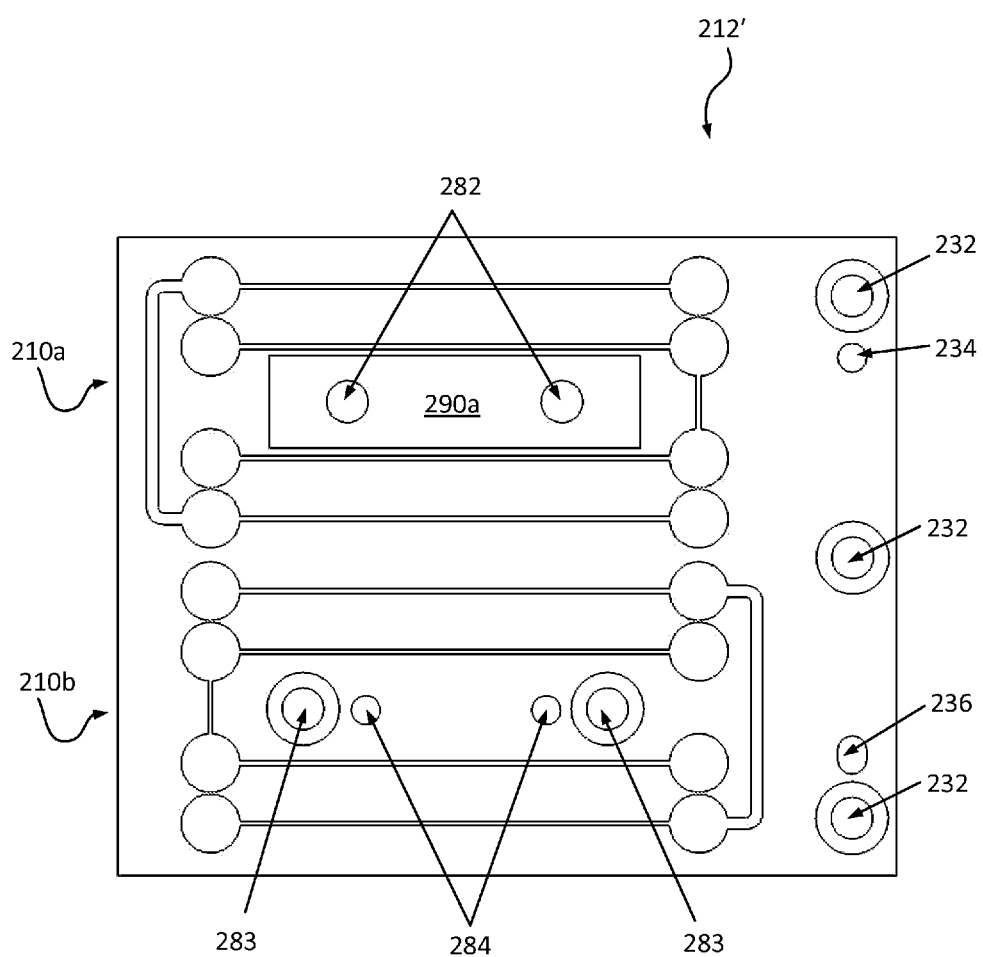

FLEXURE-BASED FOCUS MECHANISM

CROSS-REFERENCE TO RELATED APPLICATIONS

This application claims the benefit of U.S. Provisional Patent Application No. 61/533,961, filed on Sep. 13, 2011, which is herein incorporated by reference in its entirety.

FIELD OF THE DISCLOSURE

The invention relates to optical/imaging systems, and more particularly to achieving and maintaining fine focus with components thereof.

BACKGROUND

Optical/imaging systems involve a number of non-trivial challenges, and achieving and maintaining fine focus with components thereof have faced particular complications.

SUMMARY

One example embodiment of the present invention provides an apparatus including a mechanism configured to be operatively coupled with an optical/imaging component, the mechanism having at least one instance of a flexure pattern formed therein, each instance of the flexure pattern including a first flexure bar operatively coupled with a second flexure bar, wherein each instance of the flexure pattern passes completely through a wall thickness of the mechanism, and flexing of the flexure pattern produces a movement of the optical/imaging component. In some cases, the mechanism forms at least part of a housing configured to house at least a portion of the optical/imaging component. In some other cases, the mechanism includes a first wall having a first instance of the flexure pattern formed therein, a second wall having a second instance of the flexure pattern formed therein, and a third wall operatively coupling the first and second walls such that the first and second walls are arranged parallel to one another, defining a gap there between, and such that the first instance of the flexure pattern formed in the first wall and the second instance of the flexure pattern formed in the second wall are in alignment with one another across the gap. In some such instances, the gap is dimensioned to receive the optical/imaging component. In some other such instances, the first, second, and third walls define a unitary/continuous piece. In some still other such instances, the first, second, and third walls are discrete pieces securely fastened together. In some other such instances, the apparatus further includes a third instance of the flexure pattern, wherein the third instance of the flexure pattern is formed in the first wall adjacent to the first instance of the flexure pattern, and wherein the third instance of the flexure pattern is rotated 180° as compared with the first instance of the flexure pattern, and a fourth instance of the flexure pattern, wherein the fourth instance of the flexure pattern is formed in the second wall adjacent to the second instance of the flexure pattern, and wherein the fourth instance of the flexure pattern is rotated 180° as compared with the second instance of the flexure pattern, wherein the third instance of the flexure pattern formed in the first wall and the fourth instance of the flexure pattern formed in the second wall are in alignment with one another across the gap. In some example cases, the first flexure bar is defined by a first pair of parallel cuts formed adjacent to one another without overlapping/intersecting, a first pair of holes formed adjacent one another without overlapping/intersecting, thereby defining a first flexure point there between, and a second pair of holes formed adjacent one another without overlapping/intersecting, thereby defining a second flexure point there between, wherein the first and second pairs of holes are provided at opposing ends of the first pair of parallel cuts such that one end of the first flexure bar tapers into the first flexure point and another end of the first flexure bar tapers into the second flexure point, and the second flexure bar is defined by a second pair of parallel cuts formed adjacent to one another without overlapping/intersecting, a third pair of holes formed adjacent one another without overlapping/intersecting, thereby defining a third flexure point there between, and a fourth pair of holes formed adjacent one another without overlapping/intersecting, thereby defining a fourth flexure point there between, wherein the third and fourth pairs of holes are provided at opposing ends of the second pair of parallel cuts such that one end of the second flexure bar tapers into the third flexure point and another end of the second flexure bar tapers into the fourth flexure point. In some such cases, the first and second flexure bars are operatively coupled by a first connecting cut which connects the first and third pairs of holes and a second connecting cut which connects the second and fourth pairs of holes, the first pair of parallel cuts is provided parallel to the second pair of parallel cuts, and the first and second pairs of parallel cuts are substantially perpendicular to the first and second connecting cuts. In some instances, the apparatus further includes a drive assembly operatively coupled with the mechanism to cause flexing of the flexure pattern to produce movement of the optical/imaging component. In some other instances, the flexing is at least one of one-dimensional, two-dimensional, and/or three-dimensional. In some other instances, the movement assists with achieving and/or maintaining fine focus with the optical/imaging component.

Another example embodiment of the present invention provides an apparatus including a mechanism including a wall having a flexure pattern formed therein, the flexure pattern passing completely through a thickness of the wall, wherein the mechanism is configured to be operatively coupled with an optical/imaging component, and a drive assembly configured to be operatively coupled with the mechanism to cause flexing of the flexure pattern to produce a movement of the optical/imaging component, wherein the movement assists with achieving and/or maintaining fine focus with the optical/imaging component. In some cases, drive assembly includes a drive bar operatively coupled with the optical/imaging component and an actuator operatively coupled with the mechanism and configured to engage the drive bar to cause movement of the optical/imaging component relative to the mechanism. In some other cases, the drive assembly includes a flexible drive bar operatively coupled with the optical/imaging component and a piezoelectric drive motor configured to engage the flexible drive bar to cause movement of the optical/imaging component relative to the mechanism. In some instances, the apparatus further includes a housing disposed proximate an exterior of the mechanism. In some such instances, the drive assembly includes a first driver operatively coupled with the housing and with the optical/imaging component, wherein the first driver is configured to cause movement of the optical/imaging component relative to the housing, and a second driver operatively coupled with the housing and with the mechanism, wherein the second driver is configured to cause movement of the mechanism relative to the housing. In some such instances, at least one of the first driver and/or the second driver includes an actuator. In some cases, the movement is in the range of about 1-400 µm or greater.

Another example embodiment of the present invention provides a system including a mechanism including a wall having a flexure pattern formed therein, the flexure pattern passing completely through a thickness of the wall, wherein the mechanism is configured to be operatively coupled with an optical/imaging component, and a drive assembly configured to be operatively coupled with the mechanism to cause flexing of the flexure pattern to produce a movement of the optical/imaging component, wherein the movement is in the range of about 1-400 µm or greater and assists with achieving and/or maintaining fine focus with the optical/imaging component.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 2A is a perspective view of a flexure-based focus mechanism configured in accordance with an embodiment of the present invention.

FIG. 2B is a schematic view of a flexure pattern configured in accordance with an embodiment of the present invention.

FIG. 5A is a perspective view of a side wall of a flexure-based focus mechanism configured in accordance with an embodiment of the present invention.

Figure 1A:
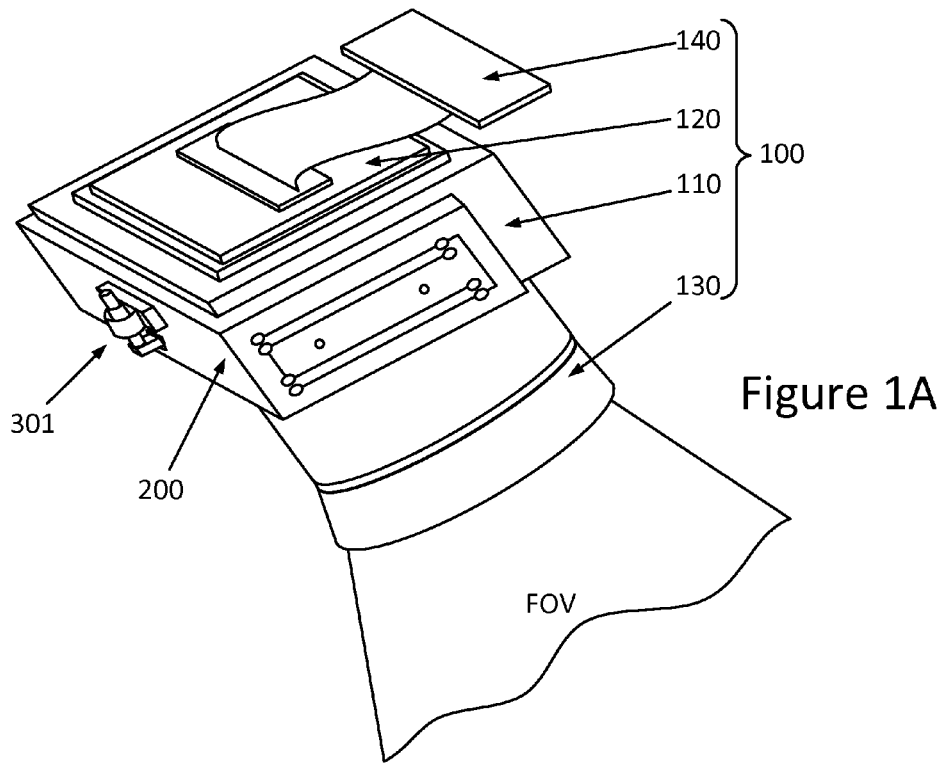
FIG. 1A is a perspective view of an example optical/imaging system component implemented with a flexure-based focus mechanism configured in accordance with an embodiment of the present invention.

These and other features of the present embodiments will be understood better by reading the following detailed description, taken together with the figures herein described. The accompanying drawings are not intended to be drawn to scale, nor are they intended to limit the claimed invention to the specific configurations shown. In the drawings, each identical or nearly identical component that is illustrated in various figures is represented by a like numeral. For purposes of clarity, not every component may be labeled in every drawing. Furthermore, while some figures generally indicate straight lines, right angles, and smooth surfaces, an actual example implementation or embodiment may have less than perfectly straight lines, right angles, etc., given real world limitations. In short, the figures are provided merely to show example structures.

DETAILED DESCRIPTION

Techniques and architecture are disclosed for stabilizing optical/imaging componentry over a broad range of environmental conditions and stressors. A flexure-based focus mechanism provided using the disclosed techniques may help to minimize or otherwise reduce the effects of a wide variety of stressors (e.g., vibration, torque, thermal expansion/contraction, etc.), thus assisting with achieving and/or maintaining fine focus with an optical/imaging component. In some cases, such a mechanism can be: (1) operatively coupled with a given optical/imaging system component; and/or (2) integrated therewith. In some instances, an optional drive assembly may be implemented in conjunction with such a mechanism to assist with achieving and/or maintaining fine focus. Numerous configurations and variations will be apparent in light of this disclosure.

General Overview

Optical/imaging systems generally yield their best results when they can achieve and maintain stable and consistent positioning of their optical components. However, as previously indicated, there are a number of non-trivial issues that can complicate achieving and maintaining a high degree of precision/accuracy with a given optical system. For example, one non-trivial issue pertains to counteracting the adverse effects on fine focus capabilities of vibration, torque, oscillation, etc., which may be encountered by an optical/imaging component, for instance, that is attached to an aircraft, vehicle, or other moving platform. Another non-trivial issue pertains to counteracting the adverse effects of thermal expansion and/or contraction which may result from subjecting an optical/imaging component to temperature changes. If left unaddressed, these and other stressors can preclude or otherwise hinder the ability of an optical/imaging system to achieve and maintain fine focus, thereby introducing significant errors/deviations in the information/data gathered from a scene within the optical/imaging system's field of view (FOV).

Thus, and in accordance with an embodiment of the present invention, techniques and architecture are disclosed for stabilizing optical/imaging componentry over a broad range of environmental conditions and stressors. The disclosed techniques can be used to provide a flexure-based focus mechanism which, in accordance with an embodiment, functions to counteract (e.g., minimize or otherwise reduce) the effects of a wide variety of physical and/or thermal stressors (e.g., vibration, torque, thermal expansion/contraction, etc.), thereby improving the ability of a given optical/imaging component to achieve and/or maintain fine focus.

In some cases, and in accordance with an embodiment, the disclosed techniques can be used to provide a flexure-based focus mechanism which can be operatively coupled with an optical/imaging component (e.g., physically mated/mounted with a housing and/or other portion of the optical/imaging component). In some other cases, and in accordance with an embodiment, the disclosed techniques can be used to provide a flexure-based focus mechanism that can be integrated with one or more portions of an optical/imaging component (e.g., made integral with a housing and/or other portion of the optical/imaging component). Numerous suitable configurations will be apparent in light of this disclosure.

In some instances, and in accordance with an embodiment of the present invention, an optional drive assembly can be implemented in conjunction with a given flexure-based focus mechanism. When included, the optional drive assembly may function to assist with producing and/or relieving flexure/deflection of the mechanism, such as by providing small scale corrective movements/adjustments (e.g., in the range of about 1-400 µm, or greater), and thus improve the ability of a given optical/imaging component to achieve and/or maintain fine focus. In some such cases, the optional drive assembly may include an actuator and a drive bar. In some other such cases, the optional drive assembly may include a set of opposing actuators. In some still other cases, the optional drive assembly may include a piezoelectric drive motor and a flexible drive bar. Numerous variations will be apparent in light of this disclosure.

Flexure Techniques

Figure 1B:
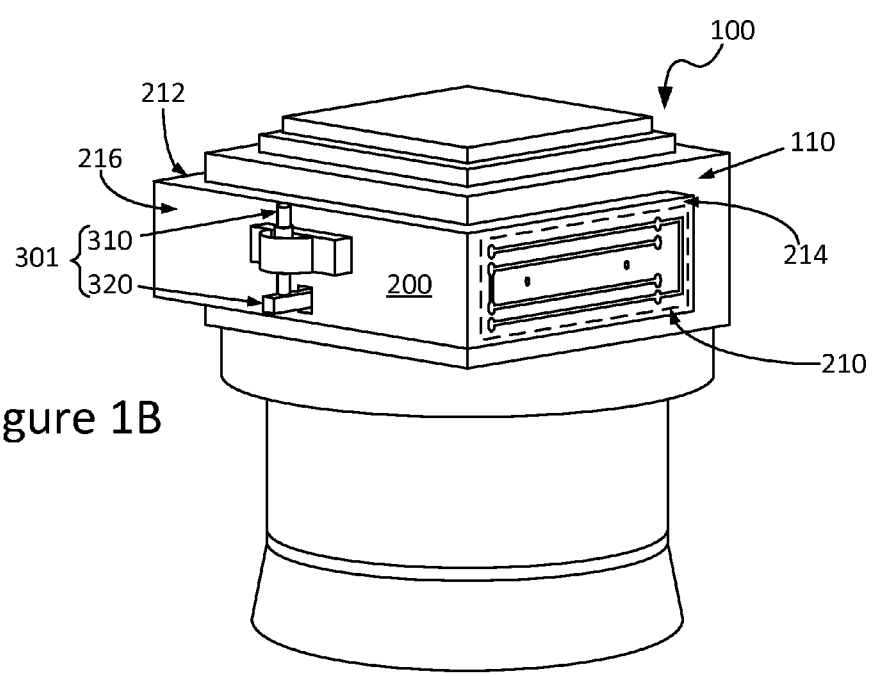
FIG. 1B is a perspective view of an example optical/imaging system component implemented with a flexure-based focus mechanism configured in accordance with an embodiment of the present invention.
Figure 2C:
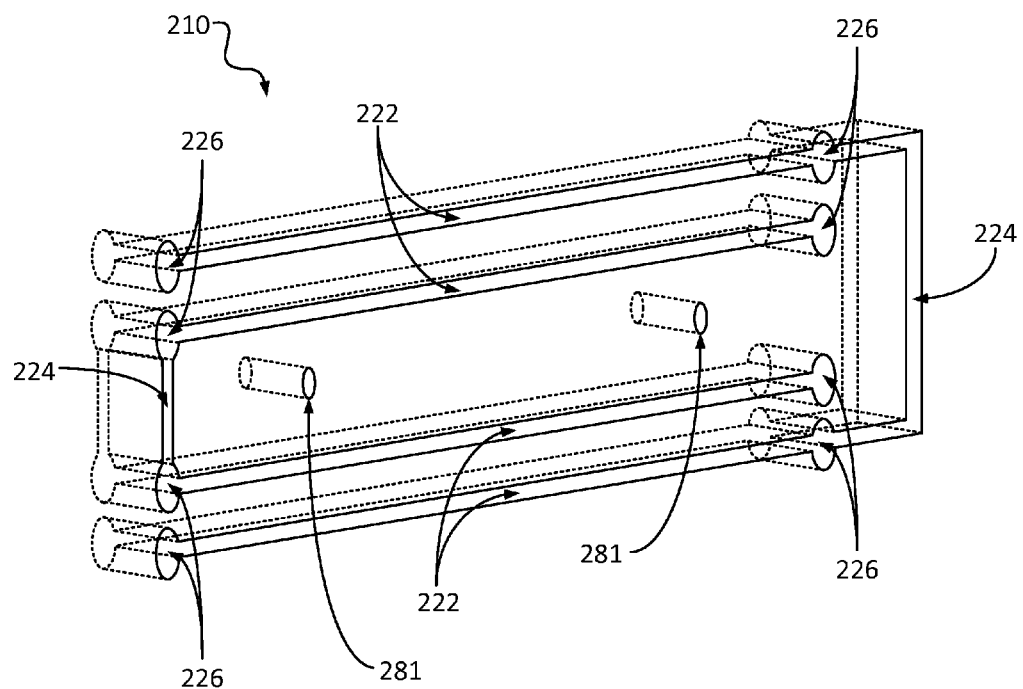
FIG. 2C is a perspective view of a flexure pattern configured in accordance with an embodiment of the present invention.

FIGS. 1A and 1B are perspective views of an example optical/imaging system component 100 implemented with a flexure-based focus mechanism 200 configured in accordance with an embodiment of the present invention. As can be seen, component 100 can include, for instance, a housing 110, a sensor 120 (e.g., a focal plane array or FPA, etc.), a lens system 130, and an output 140 (e.g., a cable, ribbon, wireless, and/or other connection/interface). As can further be seen, flexure mechanism 200 can be configured with a flexure pattern 210 (discussed below with particular reference to FIGS. 2A-2C) and operatively coupled with one or more portions (e.g., housing 110, etc.) of component 100. In some embodiments, an optional drive assembly 301 (discussed below) can be implemented in conjunction with flexure mechanism 200. As will be appreciated in light of this disclosure, optical/imaging system component 100, flexure-based focus mechanism 200, and/or optional drive assembly 301 may include additional, fewer, and/or different elements or componentry from those here described, and the claimed invention is not intended to be limited to use with any particular configurations, but can be used with numerous configurations in numerous applications.

FIG. 2A is a perspective view of a flexure-based focus mechanism 200 configured in accordance with an embodiment of the present invention. As can be seen, flexure mechanism 200 can be configured in some cases, for example, as a generally U-shaped bracket/collar having a first side wall 212, a second side wall 214 positioned opposite the first side wall 212, and a mutual back wall 216 which joins side walls 212 and 214. In some cases, side walls 212 and 214 may form substantially right angles with back wall 216 and one or more of side wall 212, side wall 214, and/or back wall 216 may be configured as a substantially planar structure of a given thickness/depth (e.g., as measured from the outermost surface of the planar structure to the innermost surface of the planar structure). In some instances, and in accordance with an embodiment, flexure mechanism 200 can be dimensioned such that it substantially conforms to the shape/geometry (e.g., substantially covers the surface area of the surfaces with which it is mounted/mated), for example, of housing 110 (and/or other portions of optical/imaging component 100) with which it may be operatively coupled. In some embodiments, flexure mechanism 200 may be configured as a single unitary/continuous piece, whereas, in some other embodiments, flexure mechanism 200 may be formed by securely fastening (or otherwise operatively coupling) discrete pieces.

Figure 7A:
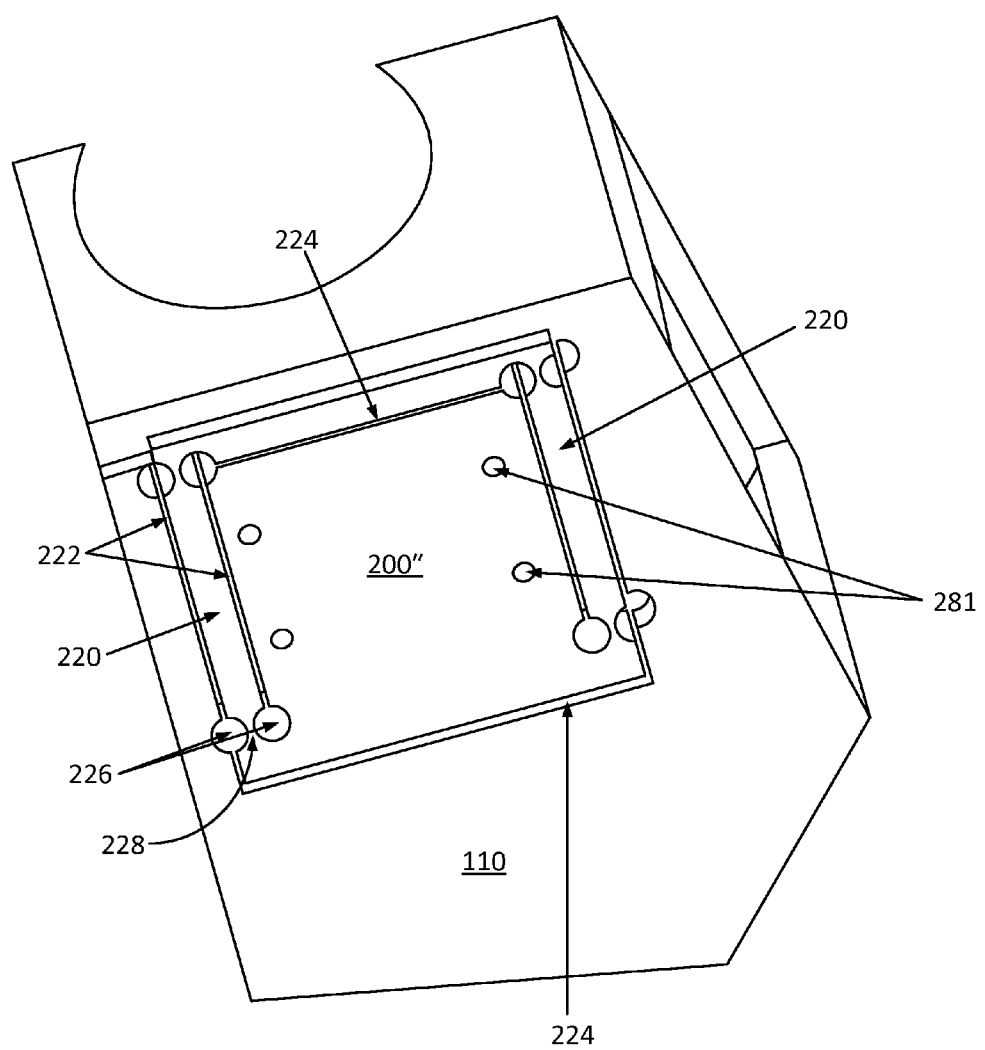
FIG. 7A is a perspective view of a housing having an integrated flexure-based focus mechanism, in accordance with an embodiment of the present invention

It should be noted, however, that flexure mechanism 200 is not limited to only the depicted example U-shaped bracket/collar configuration. For instance, and in accordance some other example embodiments, flexure mechanism 200 can be configured as: (1) a housing (e.g., such as that shown in FIGS. 7A-7B, discussed below); (2) a brace; (3) a platform; (4) a foundation; (5) a mounting plate; (6) a combination of the aforementioned; and/or (7) any other suitable structure(s), as will be apparent in light of this disclosure. Furthermore, in some cases flexure mechanism 200 can be configured such that one or more of wall 212, 214, and 216 is, at least in part, curved or otherwise non-planar. In short, the disclosed techniques can be used, in accordance with an embodiment, to provide a flexure-based focus mechanism 200 with any desired shape/geometry or which is otherwise customized for a given application.

As will be appreciated in light of this disclosure, and in accordance with an embodiment, it may be desirable to ensure that the material composition of flexure mechanism 200 allows for achieving a desired amount of flexure while maintaining sufficient physical/structural resilience over a wide range of temperatures and other environmental conditions. Some example materials include, but are not limited to: (1) aluminum (Al); (2) stainless steel; (3) an alloy of the aforementioned; and/or (4) any other suitably flexible and resilient material/metal, as will be apparent in light of this disclosure. In some cases, flexure mechanism 200 in its entirety may be made of a single material, while in some other cases multiple/combinations of materials may be implemented. In one example embodiment, flexure mechanism 200 may be machined or otherwise formed from a single bulk/block of material. Other suitable materials for flexure-based focus mechanism 200 will depend on a given application and will be apparent in light of this disclosure.

As can further be seen, and in accordance with an embodiment, a flexure pattern 210 can be formed in one or more portions (e.g., side walls 212 and/or 214) of flexure mechanism 200. For example, consider FIGS. 2B and 2C, which are a schematic view and a perspective view, respectively, of a flexure pattern 210 configured in accordance with an embodiment of the present invention. As can be seen, flexure pattern 210 may include a plurality of cuts 222, a plurality of cuts 224, and a plurality of holes 226, which collectively are configured to provide flexure mechanism 200 with one or more flexure bars 220 and/or flexure points 228, in accordance with an embodiment. A discussion of each of these various features now follows.

In accordance with an embodiment, side walls 212 and/or 214 can be configured with a plurality of cuts 222 running therethrough. As can be seen with particular reference to FIG. 2C, each cut 222 can be configured so as to traverse the full depth/thickness of side wall 212/214 (e.g., a given cut 222 passes completely through from the outermost surface to the innermost surface of side wall 212/214), in accordance with an embodiment. Returning to FIG. 2B, the cuts 222 formed in side wall 212/214 can be aligned substantially parallel with one another, in accordance with an embodiment. This substantially parallel alignment in a given side wall 212/214 may help, in accordance with an embodiment, to minimize or otherwise reduce any interferential interaction between the cuts 222 (e.g., which, in part, define the flexure bars 220 discussed below) and thus provide for maximum or an otherwise desired amount of flexure in a given direction (discussed below with reference to FIGS. 3A-3B). Other suitable configurations for cuts 222 will depend on a given application and will be apparent in light of this disclosure.

Also, in accordance with an embodiment, side walls 212 and/or 214 can be configured with a plurality of cuts 224 running therethrough. As can be seen with particular reference to FIG. 2C, each cut 224 can be configured so as to traverse the full depth/thickness of side wall 212/214 (e.g., a given cut 224 passes completely through from the outermost surface to the innermost surface of side wall 212/214), in accordance with an embodiment. Returning to FIG. 2B, the cuts 224 formed in side wall 212/214 can be aligned substantially parallel with one another, in accordance with an embodiment. This substantially parallel alignment in a given side wall 212/214 may help, in accordance with an embodiment, to minimize or otherwise reduce any interferential interaction between the cuts 224 and thus provide for maximum or an otherwise desired amount of flexure in a given direction (discussed below with reference to FIGS. 3A-3B). Also, in some cases, the plurality of cuts 222 can be configured to be aligned substantially perpendicular (e.g., orthogonal or otherwise within an acceptable tolerance) to the plurality of cuts 224 of a given side wall 212/214, in accordance with an embodiment.

As can be further seen with particular reference to FIG. 2B, in some example cases, one or more of cuts 224 may be configured to connect, for instance, one or more pairs of holes 226 (discussed below). In some embodiments, one or more of cuts 224 may be configured with one or more angled or otherwise elbowed portions 224a which may substantially align (e.g., precisely or otherwise within an acceptable tolerance) with one or more of cuts 222. In some such instances, a given portion 224a may be operatively coupled with one or more holes 226 to provide the desired connection between such pairs of holes 226. Other suitable configurations for cuts 224 will depend on a given application and will be apparent in light of this disclosure.

Furthermore, in accordance with an embodiment, side walls 212 and/or 214 can be configured with a plurality of holes 226 disposed therein. As can be seen with particular reference to FIG. 2C, each hole 226 can be configured so as to traverse the full depth/thickness of side wall 212/214 (e.g., a given hole 226 passes completely through from the outermost surface to the innermost surface of side wall 212/214), in accordance with an embodiment. Returning to FIG. 2B, holes 226 can be disposed in groupings (e.g., pairs) in side wall 212/214 (e.g., in FIGS. 2A-2C, flexure pattern 210 includes four distinct pairings of holes 226). As will be appreciated in light of this disclosure, and in accordance with an embodiment, it may be desirable to form the holes 226 simultaneously in both side wall 212 and 214, for example, to ensure precision alignment thereof across the breadth of flexure mechanism 200. However, the claimed invention is not so limited, as in some other embodiments, formation of the holes 226 in side wall 212 may be performed prior and/or subsequent to formation of the holes 226 in side wall 214. Furthermore, in some instances (e.g., when flexure mechanism 200 is made from aluminum), it may be desirable to provide holes 226 of flexure pattern 210 with highly polished interior surfaces so as to prevent or otherwise reduce susceptibility of flexure mechanism 200 to fracturing, for example, at flexure points 228 (discussed below).

In accordance with an embodiment, each of the holes 226 of a given grouping/pair thereof may be formed sufficiently proximate one another (e.g., substantially adjacent without overlapping) such that a small portion of the side wall 212/214 remains intact between the holes 226, thereby forming a flexure point 228. The function of such flexure points 228 is discussed in detail below with reference to FIGS. 3A-3B.

By virtue of how holes 226 may be provided proximate one or more ends of cuts 222, a portion (hereinafter referred to as a flexure bar 220) of side wall 212 and/or 214 may remain structurally intact there between. As can be seen, in some instances, and in accordance with an embodiment, a given flexure bar 220 may taper (e.g., in width) into one or more flexure points 228. By virtue of how flexure points 228 are configured at the ends thereof, a given flexure bar 220 may be capable of providing for flexure/deflection (e.g., bending, stretching, arching, curving, contracting, expanding, loosening, and/or tensing) in a given direction, and/or for counteraction of any of the aforementioned, in accordance with an embodiment. The function of such flexure bars 220 is discussed below with reference to FIGS. 3A-3B.

As can be seen with particular reference to FIG. 2A, the flexure pattern 210 formed in side wall 212 may be made to substantially (e.g., precisely or otherwise within an acceptable tolerance) align across the breadth of flexure mechanism 200 with the flexure pattern 210 formed in opposing side wall 214. That is, cuts 222, cuts 224, and holes 226 of side wall 212 may substantially align, respectively, with the cuts 222, cuts 224, and holes 226 of side wall 214. As will be appreciated, and in accordance with an embodiment, this alignment across flexure mechanism 200 may help to minimize or otherwise reduce any interferential interaction between the flexure patterns 210 formed in each of side wall 212 and 214 of flexure mechanism 200 and thus provide for maximum or an otherwise desired amount of flexure in a given direction (discussed below with reference to FIGS. 3A-3B).

As previously noted, flexure-based focus mechanism 200 can be configured, in some embodiments, to be operatively coupled (e.g., mounted, mated, attached, etc.) with one or more portions of optical/imaging component 100 (e.g., housing 110). To that end, and in accordance with an embodiment, flexure mechanism 200 may have formed therein one or more fastening apertures 281 (e.g., in side walls 212 and/or 214, etc.) which are configured to receive an appropriate fastener (e.g., dowel, bolt, screw, pin, post, etc.) for temporarily and/or permanently coupling flexure mechanism 200 with component 100. As will be appreciated, it may be desirable to ensure that component 100 (e.g., housing 110, etc.) is configured with appropriate/correlating fastening apertures configured to receive the fastener(s) used.

Figure 3A:
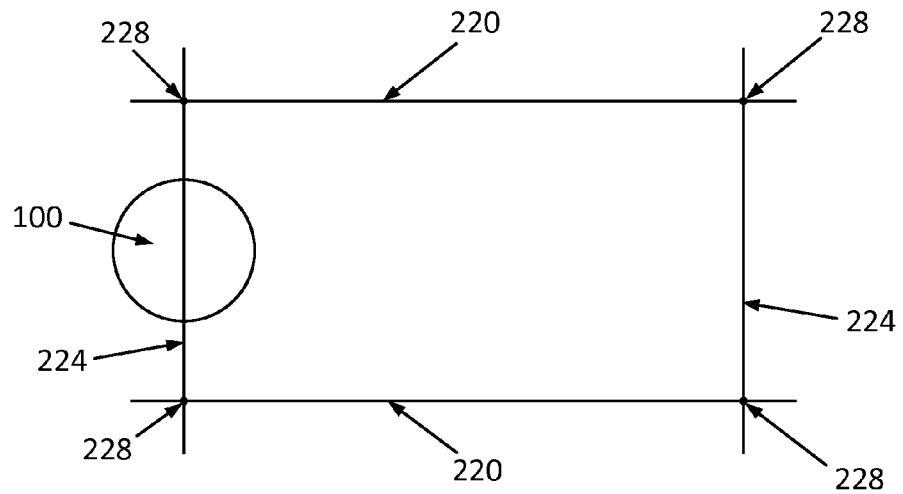
FIG. 3A is a conceptualized line diagram of a flexure-based focus mechanism configured in accordance with an embodiment of the present invention.

As previously discussed, flexure-based focus mechanism 200 can be configured to provide flexure which may assist with achieving and maintaining fine focus with a given optical/imaging system component 100. Consider FIGS. 3A and 3B, which are conceptualized line diagrams of a flexure-based focus mechanism 200 configured in accordance with an embodiment of the present invention. FIG. 3A represents the non-deflected (normal) state of flexure bars 220, in which component 100 is in its normal position relative to flexure mechanism 200. As can be seen, flexure bars 220 (defined in part by cuts 222, as previously discussed) are substantially parallel with one another, cuts 224 are substantially parallel with one another, and the flexure points 228 on the right-hand side of the diagram are substantially parallel with the flexure points 228 on the left-hand side of the diagram. Thus, in this normal state, flexure bars 220 are substantially perpendicular with cuts 224.

Figure 3B:
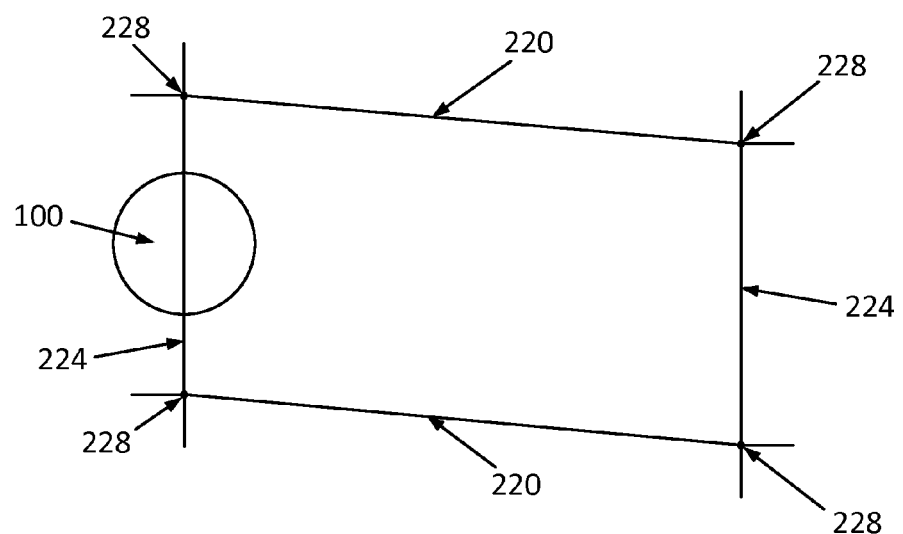
FIG. 3B is a conceptualized line diagram of a flexure-based focus mechanism configured in accordance with an embodiment of the present invention.

By virtue of how flexure mechanism 200 may be operatively coupled with component 100, component 100 may move upwardly and/or downwardly parallel to flexure points 228. This in turn may cause a flexure/deflection (e.g., upward, downward, etc.) in flexure bars 220. FIG. 3B represents the deflected (flexing) state of flexure bars 220, in which component 100 has moved away from its normal position relative to flexure mechanism 200. As before with FIG. 3A, flexure bars 220 are substantially parallel with one another, cuts 224 are substantially parallel with one another, and the flexure points 228 on the right-hand side of the diagram are substantially parallel with the flexure points 228 on the left-hand side of the diagram. However, as can be seen, flexure bars 220 no longer remain perpendicular with respect to cuts 224.

In accordance with an embodiment, flexure bars 220 may counteract this flexure/deflection from the normal state, making a corrective response/adjustment relative to the movement of optical/imaging system component 100 by deflecting, rotating, pivoting, and/or otherwise moving about one or more of the flexure points 228 (e.g., flexure is provided in a direction that is substantially perpendicular to the lateral length of flexure bar 220). As will be appreciated in light of this disclosure, and in accordance with an embodiment, such corrective response/adjustment may be performed on a very small scale (e.g., in very small, precise increments, for example, in the range of about 1-200 µm or greater). Consequently, and in accordance with an embodiment, sensor 120 may be made to stay normal to the axis of lens system 130, providing for achievement and/or maintenance of fine focus with optical/imaging system component 100.

It should be noted, however, that the claimed invention is not limited to flexure only in one direction (e.g., substantially perpendicular to flexure bar 220). For instance, and in accordance with an embodiment, the disclosed techniques can be used to provide a flexure mechanism 200 which may provide flexure in multiple (e.g., two or three dimensions), as desired. Furthermore, and in accordance with an embodiment, flexure in two or more dimensions can be provided separately and/or simultaneously using the disclosed techniques.

As previously noted, and in accordance with an embodiment of the present invention, an optional drive assembly 301 can be implemented in conjunction with a flexure-based focus mechanism 200, for example, to assist with producing and/or relieving flexure/deflection. In some example cases, drive assembly 301 may include a driver 310 and a drive bar 320 (e.g., as shown in FIGS. 1A and 1B). In accordance with an embodiment, driver 310 can be an actuator or other suitable device which is operatively coupled with flexure mechanism 200 and configured to engage drive bar 320. Drive bar 320, in accordance with an embodiment, can be an extension (e.g., a tab, rod, shaft, etc.) which is operatively coupled with optical/imaging system component 100 (e.g., housing 110 thereof) and which extends through flexure mechanism 200 (e.g., through an appropriate aperture provided, for example, in back wall 216 of flexure mechanism 200). Other suitable configurations for drive assembly 301, driver 310, and/or drive bar 320 will depend on a given application and will be apparent in light of this disclosure.

When activated, driver 310 may function to engage (e.g., push, pull, rotate, bend, etc.) drive bar 320, in accordance with an embodiment, to cause movement of optical/imaging system component 100. In some instances, drive bar 320 can be biased (e.g., spring-biased, etc.) towards driver 310 to help ensure consistent and repeatable engagement.

By virtue of how flexure mechanism 200 can be operatively coupled with component 100, movement of flexure mechanism 200 via driver 310 engaging drive bar 320 may produce an upward/downward flexure/deflection in flexure bars 220. In turn, flexure bars 220, may counter such flexure/deflection from their normal state, making a corrective response/adjustment relative to the movement of optical/imaging system component 100 by moving, deflecting, rotating, pivoting, etc., about one or more flexure points 228. As previously discussed, in some embodiments the corrective response/adjustment may be performed on a very small scale (e.g., in very small, precise increments, for example, in the range of about 1-200 µm or greater). As a result, and in accordance with an embodiment, flexure mechanism 200 may permit sensor 120 to remain normal to the axis of lens system 130, thereby providing for achievement and/or maintenance of fine focus with optical/imaging component 100.

Flexure with Lateral Shift Compensation

Figure 4A:
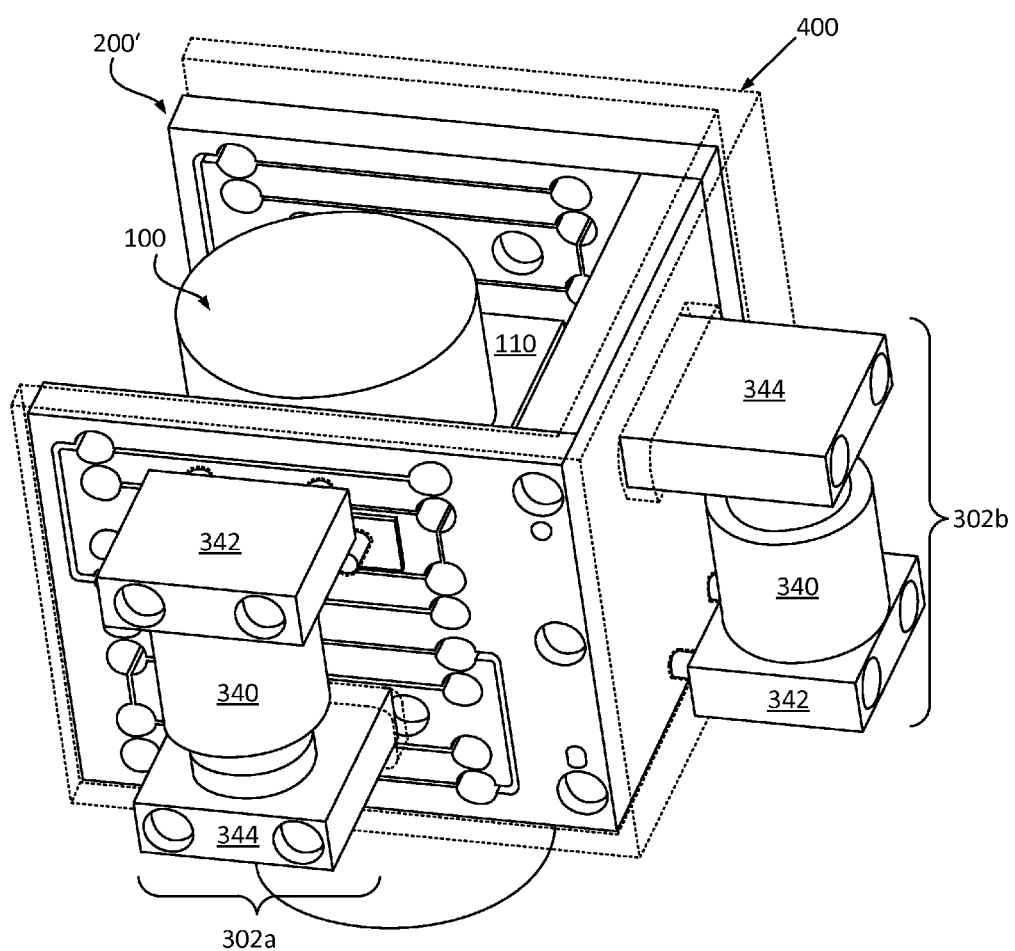
FIG. 4A is a perspective view of an example optical/imaging system component implemented with a flexure-based focus mechanism configured in accordance with an embodiment of the present invention.

FIG. 4A is a perspective view of an example optical/imaging system component 100 implemented with a flexure-based focus mechanism 200' configured in accordance with an embodiment of the present invention. As can be seen, flexure mechanism 200' can be operatively coupled with one or more portions of an optical/imaging system component 100 (e.g., housing 110, etc.) and, in some embodiments, may be implemented with an outer housing 400. In some embodiments, one or more optional drive assemblies 302a and/or 302b (discussed below) can be implemented in conjunction with flexure mechanism 200' to independently drive one or more of the flexure patterns 210 of flexure mechanism 200'. It should be noted that, for purposes of clarity, outer housing 400 has been illustrated in FIG. 4A with dotted lines and in a transparent manner to more clearly reveal the underlying features (e.g., flexure patterns 210, various fastening apertures, etc.) and to see how drive assemblies 302a/302b may be implemented. As will be appreciated in light of this disclosure, flexure-based focus mechanism 200' and/or drive assemblies 302a/302b may include additional, fewer, and/or different elements or componentry from those here described, and the claimed invention is not intended to be limited to use with any particular configurations, but can be used with numerous configurations in numerous applications.

Figure 4B:
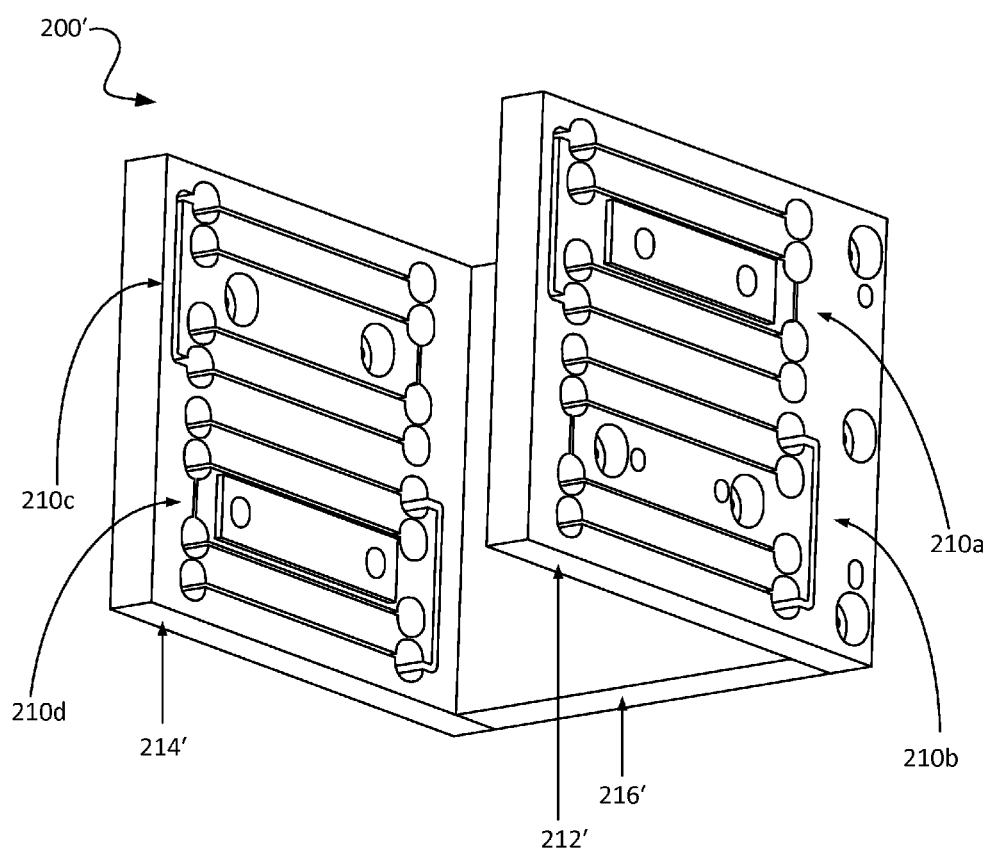
FIG. 4B is a perspective view of a flexure-based focus mechanism configured in accordance with an embodiment of the present invention.

FIG. 4B is a perspective view of a flexure-based focus mechanism 200' configured in accordance with an embodiment of the present invention. As can be seen, flexure-based focus mechanism 200' can be configured in some cases, for example, as a generally U-shaped bracket/collar having a first side wall 212', a second side wall 214' positioned opposite the first side wall 212', and a mutual back wall 216' which joins side walls 212' and 214'. As will be appreciated, and in accordance with an embodiment, the discussion provided above in the context of flexure mechanism 200 regarding the numerous example configurations, geometries, dimensions, materials, etc., thereof may apply equally here in the context of flexure mechanism 200'. Thus, as will be further appreciated, the disclosed techniques can be used, in accordance with an embodiment, to provide a flexure-based focus mechanism 200' with any desired shape/geometry or which is otherwise customized for a given application.

As can further be seen, and in accordance with an embodiment, a plurality of flexure patterns 210 (e.g., 210*a*, 210*b*, 210*c*, 210*d*) can be formed in one or more portions (e.g., side walls 212' and/or 214') of flexure mechanism 200'. As will be further appreciated, the discussion provided above in the context of flexure mechanism 200 regarding the configurations and alignments of flexure patterns 210 (e.g., cuts 222, cuts 224, holes 226, flexure bars 220, flexure points 228) may apply equally here in the context of flexure mechanism 200'. Still further, the discussion provided above with reference to FIGS. 3A-3B regarding the flexure/deflection of flexure patterns 210 may apply equally here in the context of flexure mechanism 200'.

FIG. 5A is a perspective view of a side wall 212' of a flexure-based focus mechanism 200' configured in accordance with an embodiment of the present invention. As can be seen, side wall 212' may be provided with a pair of flexure patterns 210*a* and 210*b* which are formed adjacent (or otherwise proximate) one another and which are oppositely oriented (e.g., rotated) 180° with respect to one another to achieve a desired flexure performance (discussed below).

In some cases, flexure pattern 210*a* of side wall 212' may have formed therewith one or more fastening apertures 282. In some such instances, and in accordance with an embodiment, apertures 282 may be configured to receive suitable fasteners (e.g., dowel, bolt, screw, pin, post, etc.) for operatively coupling outer housing 400 with flexure mechanism 200' at flexure pattern 210*a*. Also, in some instances, a raised/stepped region 290*a* (e.g., such as that visible in FIGS. 5A and 6B) may be provided to physically offset side wall 212' from outer housing 400 when operatively coupled therewith, in accordance with an embodiment.

In some cases, flexure pattern 210*b* of side wall 212' may have formed therewith one or more fastening apertures 283. In some such instances, and in accordance with an embodiment, apertures 283 may be configured to receive suitable fasteners (e.g., dowel, bolt, screw, pin, post, etc.) for operatively coupling optical/imaging system component 100 with flexure mechanism 200' at flexure pattern 210*b*. Furthermore, in some cases, flexure pattern 210*b* of side wall 212' may have formed therewith one or more fastening apertures 284. In some such instances, and in accordance with an embodiment, apertures 284 may be configured to receive suitable fasteners (e.g., dowel, bolt, screw, pin, post, etc.) for operatively coupling arm 344 of drive assembly 302*a* with flexure mechanism 200' at flexure pattern 210*b*. Also, in some instances, a raised/stepped region 290*b* (e.g., such as that visible in FIG. 6B) may be provided to physically offset component 100 from side wall 212' when operatively coupled therewith, in accordance with an embodiment.

Still further, in some cases, side wall 212' may have formed therein one or more apertures 232 configured to receive suitable fasteners (e.g., dowel, bolt, screw, pin, post, etc.) for operatively coupling side wall 212' with back wall 216'. As discussed below, it may be desirable to ensure that back wall 216' also includes appropriate/correlating fastening apertures 232 to receive the fastener(s) used between side wall 212' and back wall 216'.

In some embodiments, side wall 212' may be configured with one or more alignment features such as, for example, an alignment hole 234 and/or an alignment slot 236. In accordance with an embodiment, alignment hole 234 and/or alignment slot 236 may be configured to receive suitable fasteners (e.g., dowel, bolt, screw, pin, post, etc.). Furthermore, and in accordance with an embodiment, alignment hole 324 may be configured to provide locating in x and y, while alignment slot 326 may be configured to provide locating in angle, thereby preventing or otherwise reducing clocking of flexure mechanism 200'. In some cases, it may be desirable to configure alignment slot 236 with at least one dimension that is different from alignment hole 234. For instance, in one specific example embodiment, alignment slot 236 and alignment hole 234 can be configured to have similar widths but different lengths. As will be appreciated in light of this disclosure, and in accordance with an embodiment, this may help to avoid critical dimension tolerance requirements between the fasteners utilized therein.

Figure 5B:
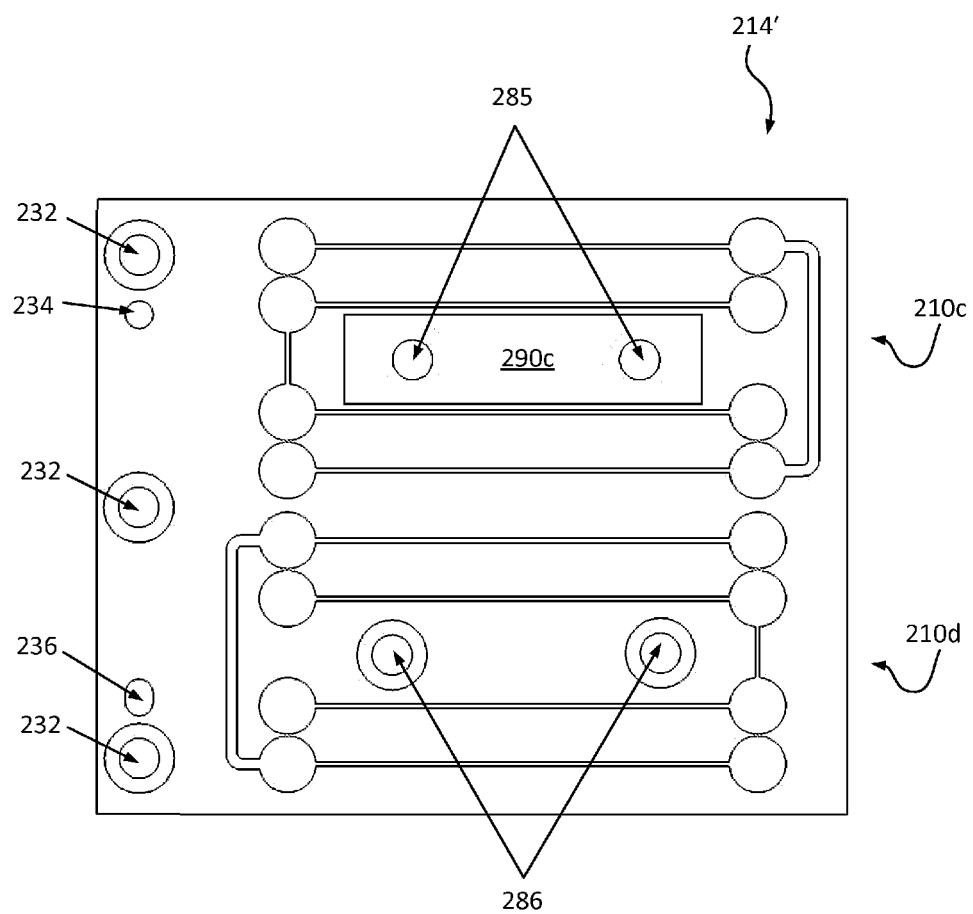
FIG. 5B is a perspective view of a side wall of a flexure-based focus mechanism configured in accordance with an embodiment of the present invention.

FIG. 5B is a perspective view of a side wall 214' of a flexure-based focus mechanism 200' configured in accordance with an embodiment of the present invention. As can be seen, side wall 214' may be provided with a pair of flexure patterns 210*c* and 210*d* which are formed adjacent (or otherwise proximate) one another and which are oppositely oriented (e.g., rotated) 180° with respect to one another to achieve a desired flexure performance (discussed below).

In some cases, flexure pattern 210*c* of side wall 214' may have formed therewith one or more fastening apertures 285. In some such instances, and in accordance with an embodiment, apertures 285 may be configured to receive suitable fasteners (e.g., dowel, bolt, screw, pin, post, etc.) for operatively coupling outer housing 400 with flexure mechanism 200' at flexure pattern 210*c*. Also, in some instances, a raised/stepped region 290*c* (e.g., such as that visible in FIGS. 5B and 6B) may be provided to physically offset side wall 214' from outer housing 400 when operatively coupled therewith, in accordance with an embodiment.

In some cases, flexure pattern 210*d* of side wall 214' may have formed therewith one or more fastening apertures 286. In some such instances, and in accordance with an embodiment, apertures 286 may be configured to receive suitable fasteners (e.g., dowel, bolt, screw, pin, post, etc.) for operatively coupling optical/imaging system component 100 with flexure mechanism 200' at flexure pattern 210*d*. Also, in some instances, a raised/stepped region 290*d* (e.g., such as that visible in FIG. 6B) may be provided to physically offset component 100 from side wall 214' when operatively coupled therewith, in accordance with an embodiment.

Still further, in some cases, side wall 214' may have formed therein one or more apertures 232 configured to receive suitable fasteners (e.g., dowel, bolt, screw, pin, post, etc.) for operatively coupling side wall 214' with back wall 216'. Again, as discussed below, it may be desirable to ensure that back wall 216' also includes appropriate/correlating fastening apertures 232 to receive the fastener(s) used between side wall 214' and back wall 216'. In some embodiments, side wall 214' can be configured with one or more alignment features such as, for example, an alignment hole 234 and/or an alignment slot 236, in much the same fashion as discussed above with reference to FIG. 5A.

Figure 5C:
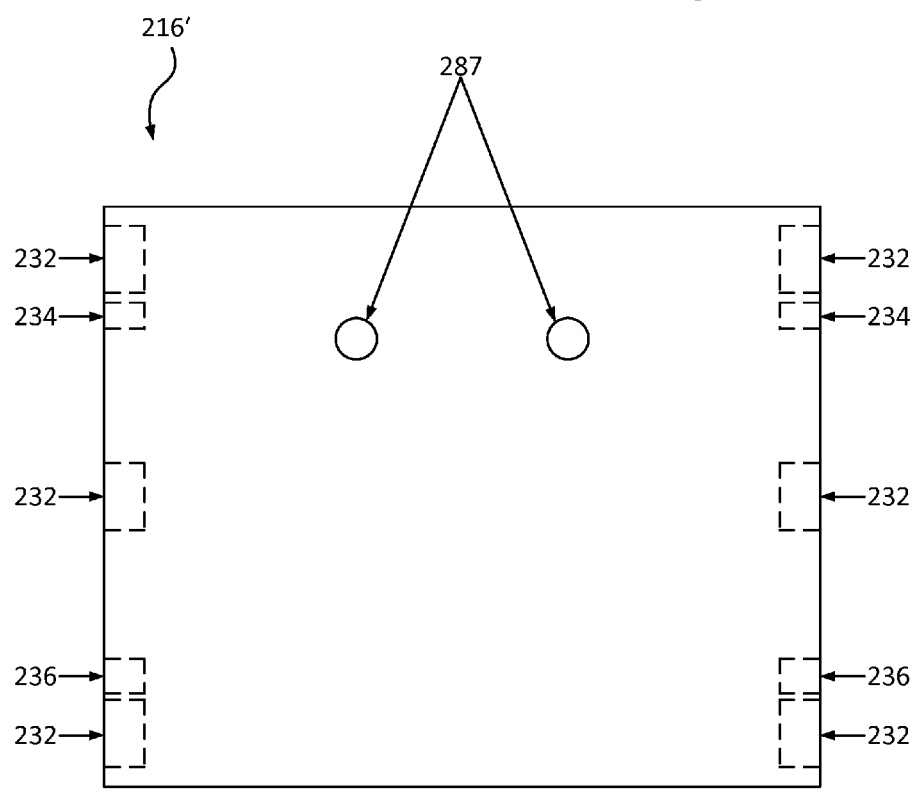
FIG. 5C is a perspective view of a back wall of a flexure-based focus mechanism configured in accordance with an embodiment of the present invention.

FIG. 5C is a perspective view of a back wall 216' of a flexure-based focus mechanism 200' configured in accordance with an embodiment of the present invention. As can be seen, back wall 216' may have formed therein one or more fastening apertures 287 configured to receive suitable fasteners (e.g., dowel, bolt, screw, pin, post, etc.) for operatively coupling arm 344 of drive assembly 302b with flexure mechanism 200'. As can further be seen, back wall 216' can be configured with apertures 232, alignment holes 234, and alignment slots 236 which correspond with those provided in side walls 212' and/or 214', as discussed above with reference to FIGS. 5A-5B.

As will be appreciated in light of this disclosure, and in accordance with an embodiment, additional apertures (e.g., fastening or otherwise) may be provided in one or more portions of mechanism 200' (e.g., in side wall 212', side wall 214', and/or back wall 216') as desired for additional operative coupling capabilities.

As previously noted, one or more drive assemblies 302a and/or 302b can be implemented in conjunction with flexure-based focus mechanism 200'. For example, consider FIG. 6A, which is a schematic view of a drive assembly 302b operatively coupled with a flexure-based focus mechanism 200', in accordance with an embodiment of the present invention. As can be seen, drive assembly 302b may include, in some embodiments, an actuator 340 (e.g., a voice coil motor), an arm 342 disposed at one end of actuator 340, and another arm 344 disposed at another end of actuator 340. In accordance with an embodiment, outer housing 400 may be configured with an opening 444b formed therein which allows arm 344 of drive assembly 302b to pass through outer housing 400 to be operatively coupled, for example, with back wall 216' of flexure mechanism 200' at fastening apertures 287 thereof. As will be appreciated in light of this disclosure, and in accordance with an embodiment, it may be desirable to provide opening 444b with one or more dimensions larger, for example, than arm 344 of drive assembly 302b to allow for the desired range of movement of arm 344 therein.

Figure 6A:
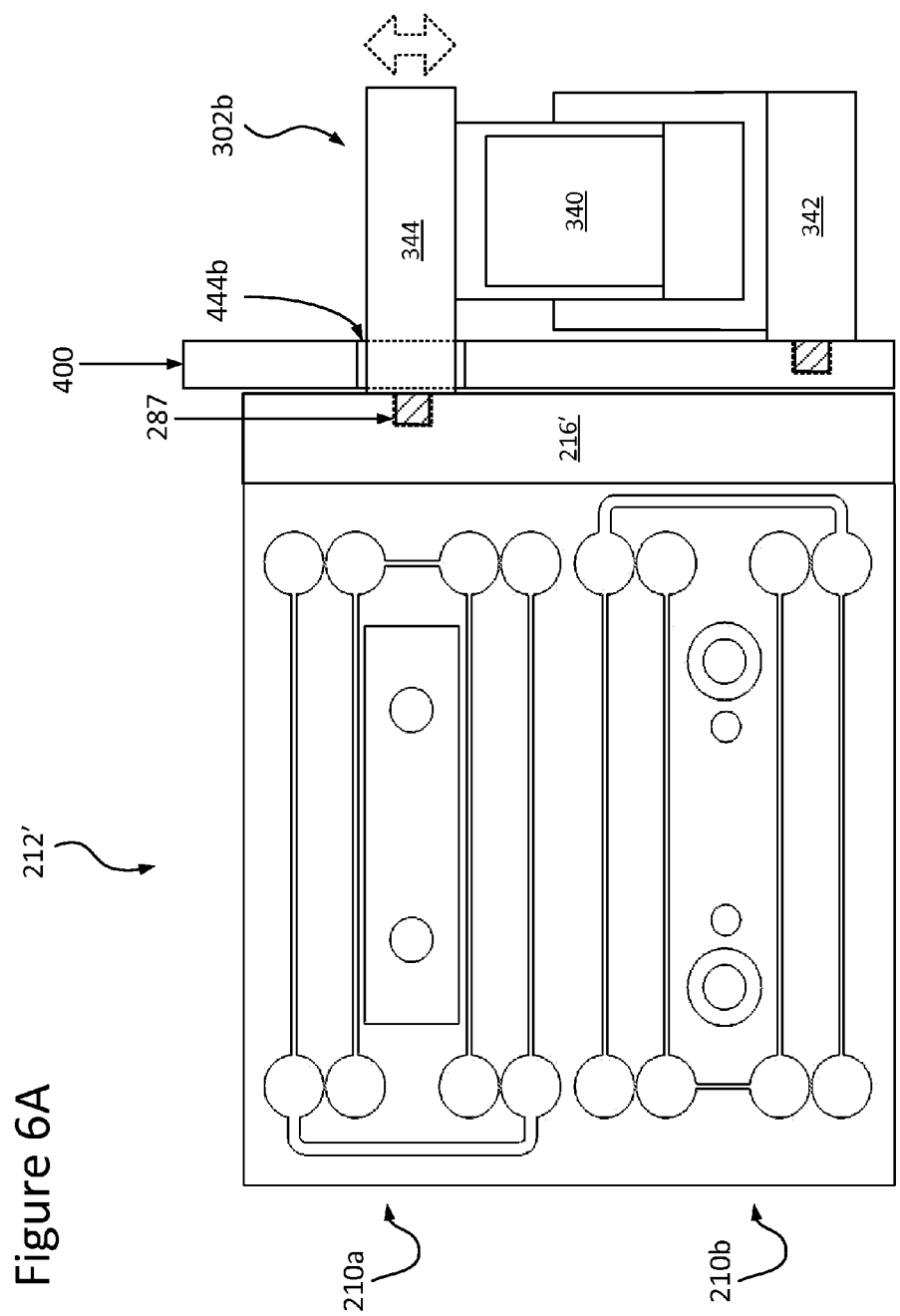
FIG. 6A is a schematic view of a drive assembly operatively coupled with a flexure-based focus mechanism, in accordance with an embodiment of the present invention.
Figure 6B:
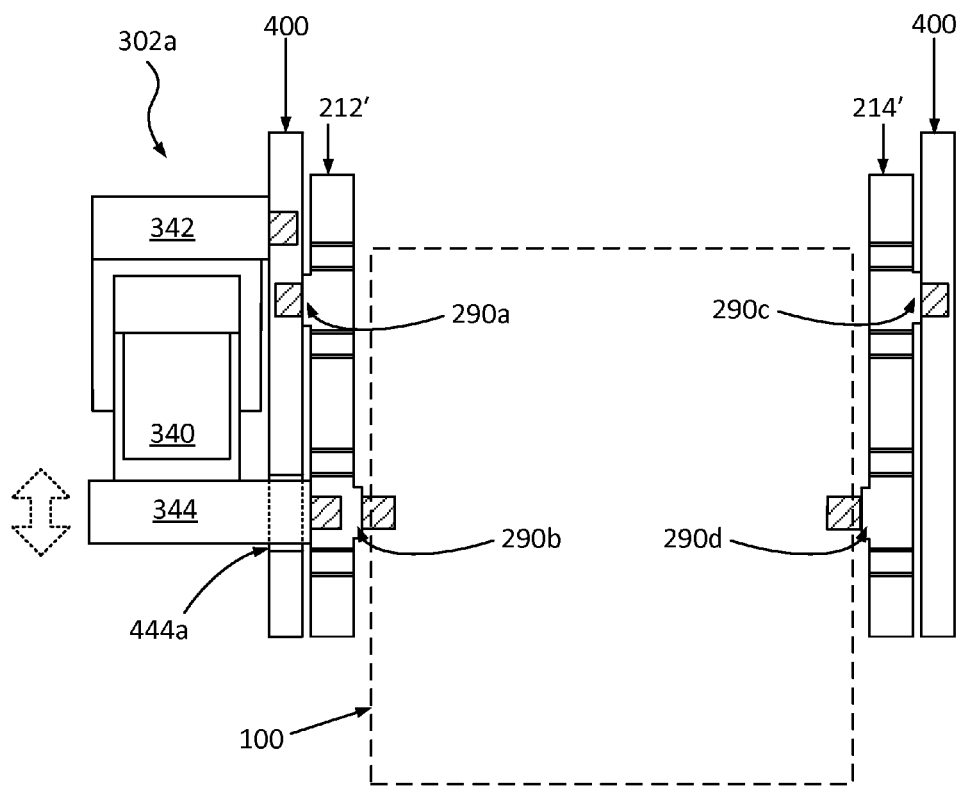
FIG. 6B is a schematic view of a drive assembly operatively coupled with a flexure-based focus mechanism, in accordance with an embodiment of the present invention.

Also, consider FIG. 6B, which is a schematic view of a drive assembly 302a operatively coupled with a flexure-based focus mechanism 200', in accordance with an embodiment of the present invention. As can be seen, drive assembly 302a may be configured in much the same way as drive assembly 302b (e.g., an actuator 340 with arms 342 and 344) with a difference in that drive assembly 302a may be oriented in the opposite direction (e.g., inverted, such as by rotating through 180°) as compared to drive assembly 302b. As will be appreciated in light of this disclosure, and in accordance with an embodiment, this opposing orientation may allow for drive assemblies 302a and 302b to counteract one another and thus provide a desired flexure performance (discussed below). However, the claimed invention is not so limited, as in some other embodiments, drive assembly 302a and drive assembly 302b may not be oriented in opposing directions (e.g., not inverted relative to one another). In accordance with an embodiment, outer housing 400 may be configured with an opening 444a formed therein which allows arm 344 of drive assembly 302a to pass through outer housing 400 to be operatively coupled, for example, with flexure pattern 210b of side wall 212' of flexure mechanism 200' at fastening apertures 284 thereof. As will be appreciated in light of this disclosure, and in accordance with an embodiment, it may be desirable to provide opening 444a with one or more dimensions larger, for example, than arm 344 of drive assembly 302a to allow for the desired range of movement of arm 344 therein.

In accordance with an embodiment, use of separate drive assemblies 302a and 302b may allow for: (1) driving the various flexure patterns 210 of flexure mechanism 200' independently; and/or (2) driving flexure mechanism 200' and/or optical/imaging system component 100 relative to outer housing 400. For instance, in some embodiments, drive assembly 302b may be configured (e.g., as shown in FIG. 6A) to have its arm 342 operatively coupled with outer housing 400 and its arm 344 operatively coupled with back wall 216' of flexure mechanism 200'. By virtue of this example configuration, drive assembly 302b can be used to provide movement/displacement of flexure mechanism 200' relative to outer housing 400. Also, in some embodiments, drive assembly 302a may be configured (e.g., as shown in FIG. 6B) to have its arm 342 operatively coupled with outer housing 400 and its arm 344 operatively coupled with flexure pattern 210b of side wall 212' of flexure mechanism 200'. By virtue of this example configuration, drive assembly 302a can be used to provide movement/displacement of optical/imaging system component 100 (e.g., which may be operatively coupled with flexure pattern 210b) relative to outer housing 400. Thus, in one specific example embodiment, flexure mechanism 200' may provide for a corrective response/adjustment stroke length in the range of about 1-400 μm or greater.

Also, and in accordance with an embodiment, drive assemblies 302a and 302b may be configured to compensate (in whole or in part) for any relative shortening of the flexure bars 220 of the flexure patterns 210 of flexure mechanism 200' during flexing/deflection thereof. By virtue of their opposing orientation, drive assemblies 302a and 302b may be operated simultaneously to counteract one another; that is, in accordance with an embodiment, drive assembly 302a can be operated to cause flexure/deflection in one direction, while drive assembly 302b can be operated to cause a counteracting flexure/deflection in the opposite direction. Thus, flexure mechanism 200' may be used to eliminate or otherwise reduce the susceptibility of a given optical/imaging system component 100 to lateral shifting which may occur during such flexure/deflection, thereby improving fine focus capabilities.

In some cases, and in accordance with an embodiment, one or more of drive assemblies 302a and 302b optionally may include, for example, a position sensor to measure the displacement/difference between arms 342 and 344 of a given actuator 340. For instance, in one specific example embodiment, a linear variable differential transformer (LVDT) (and/or any other device capable of providing resolution on the order of microns) optionally may be implemented with one or both of drive assemblies 302a and/or 302b.

Integrated Flexure

In accordance with an embodiment, the disclosed techniques/structure can be used to provide a flexure-based focus mechanism 200" which may be integrated, for example, with a housing 110 (and/or one or more other portions) of an optical/imaging system component 100. For example, consider FIGS. 7A and 7B, which are perspective views of a housing 110 having an integrated flexure-based focus mechanism 200", in accordance with an embodiment of the present invention. As can be seen, flexure mechanism 200" can be formed in or otherwise made integral with housing 110. In accordance with an embodiment, one or more flexure patterns 210 (e.g., cuts 222, cuts 224, holes 226, fastening apertures 281, etc.) can be formed directly in, for example, a wall or other portion of housing 110. Thus, flexure bars 220 and flexure points 228 can be formed directly from housing 110.

As will be appreciated in light of this disclosure, and in accordance with an embodiment, a housing 110 having an integrated flexure-based focus mechanism 200" also may be configured to house or otherwise accommodate, in part or in whole, one or more other portions (e.g., sensor 120, lens system 130, output 140, etc.) of a given optical/imaging system component 100. In some cases, and in accordance with an embodiment, such housing 110 may be configured with one or more optical paths therein as provided by internal and/or external optical componentry of optical/imaging system component 100.

Figure 7B:
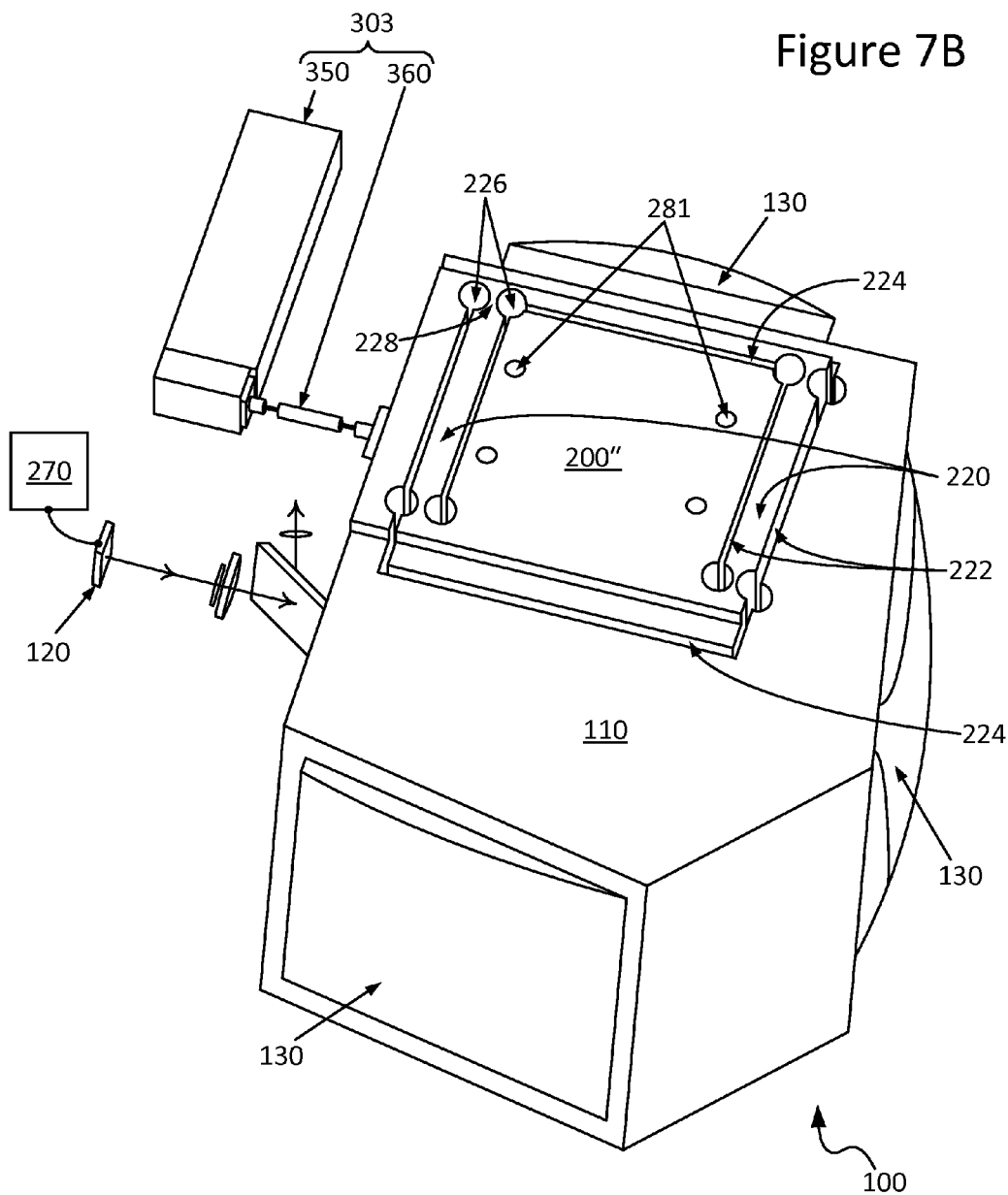
FIG. 7B is a perspective view of a housing having an integrated flexure-based focus mechanism, in accordance with an embodiment of the present invention.

As can be seen with reference to FIG. 7B, in some embodiments, an optional drive assembly 303 can be implemented in conjunction with a flexure-based focus mechanism 200", for example, to assist with producing and/or relieving flexure/deflection. In some example cases, drive assembly 303 may include a piezoelectric drive motor 350 and a flexible drive bar 360.

In accordance with an embodiment, piezoelectric drive motor 350 can be operatively coupled with flexible drive bar 360 (discussed below with reference to FIG. 7C), which in turn can be operatively coupled with optical/imaging system component 100 (e.g., with housing 110 thereof). Furthermore, and in accordance with an embodiment, piezoelectric drive motor 350 and flexible drive bar 360 may be implemented, for example, proximate one or more flexure bars 220 of flexure mechanism 200".

Figure 7C:
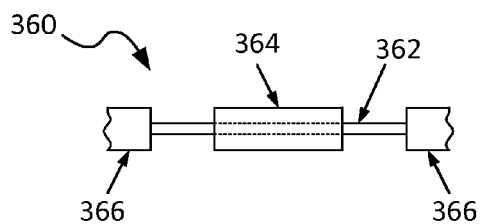
FIG. 7C is a partial side view of a flexible drive bar configured in accordance with an embodiment of the present invention.

FIG. 7C is a partial side view of a flexible drive bar 360 configured in accordance with an embodiment of the present invention. As can be seen, in one specific example embodiment, flexible drive bar 360 may be a metal body 362 (e.g., stainless steel wire) having a stiffener portion 364 operatively coupled thereto (e.g., to prevent or otherwise reduce bowing, bending, and/or breaking of the metal body 362) and including a pair of metal end caps 366 (e.g., beryllium copper or BeCu). Other suitable materials and/or configurations for flexible drive bar 360 will depend on a given application and will be apparent in light of this disclosure.

When activated, piezoelectric drive motor 350 may function to engage (e.g., push, pull, bend, etc.) flexible drive bar 360, in accordance with an embodiment, thereby causing movement of one or more portions of optical/imaging system component 100. By virtue of how flexure mechanism 200" may be integrated (or otherwise operatively coupled) with optical/imaging component 100, movement of component 100 via piezoelectric drive motor 350 and flexible drive bar 360 may cause a flexure/deflection in flexure bars 220 (e.g., such as is discussed above with reference to FIGS. 3A-3B). In turn, flexure bars 220, by virtue of their configuration, may counter such deflection from their normal state, making a corrective response/adjustment relative to the movement of component 100 by moving (e.g., deflecting, rotating, pivoting, etc.) about one or more flexure points 228. As previously discussed, the corrective response/adjustment may be performed on a very small scale (e.g., in very small, precise increments, for example, in the range of about 1-200 µm or greater). As a result, and in accordance with an embodiment, sensor 120 may be made to remain normal to the axis of lens system 130, providing for achievement and/or maintenance of fine focus with optical/imaging component 100. Other suitable configurations for optional drive assemblies 303, when included, will depend on a given application and will be apparent in light of this disclosure.

As can further be seen from FIG. 7B, in some embodiments an optional cooling element 270 can be included, for example, to assist with regulating the temperature of sensor 120 of optical/imaging component 100. Some example configurations for cooling element 270 include, but are not limited to: (1) a dewar; (2) a thermoelectric cooler (TEC); (3) a cold-finger device; (4) a combination of the aforementioned; and/or (5) any other suitable means/device for regulating the temperature of a sensor 120 (e.g., FPA), as will be apparent in light of this disclosure. As will be appreciated, and in accordance with an embodiment, optional cooling element 270, when included, may be integral with housing 110 or may be a separate body. Other suitable configurations for optional cooling element 270 will depend on a given application and will be apparent in light of this disclosure.

The foregoing description of the embodiments of the invention has been presented for the purposes of illustration and description. It is not intended to be exhaustive or to limit the invention to the precise form disclosed. Many modifications and variations are possible in light of this disclosure. For example, in some cases, as opposed to being formed/defined by the remaining material between a pair of holes 226, a given flexure point 228 may be provided instead by inclusion of a piece of flat spring steel configured to provide the desired flexing for a given application. In some such instances, a first end of the piece of flat spring steel may be operatively coupled (e.g., clamped or otherwise suitably attached) with an end of a given flexure bar 220 while a second end of the piece of flat spring steel may be operatively coupled (e.g., clamped or otherwise suitably attached) with the body (e.g., mechanism 200, 200', 200", etc.) in which that flexure bar 220 is provided. Thus, in some instances, and in accordance with an embodiment, a given mechanism 200/200'/200" may be provided with a given flexure pattern 210, in part or in whole, by assembly thereof (e.g., as opposed to being provided, for instance, by a machining process). It is intended that the scope of the invention be limited not by this detailed description, but rather by the claims appended hereto.

What is claimed is:
1. An apparatus comprising:
a mechanism configured to be operatively coupled with an optical/imaging component, the mechanism comprising a wall having a flexure pattern that defines an elongated member formed therein, the member extending along a distance of the wall in a first direction and having first and second ends and being attached at only the first end via first and second flexure points, the member including
a first flexure bar extending from the first flexure point and along the first direction,
a second flexure bar extending from the second flexure point and along the first direction, and
a mounting portion configured to receive the optical/imaging component, wherein the mounting portion is operatively coupled to the first flexure bar and the second flexure bar proximate to the second end of the member, wherein the mounting portion resides directly between the first and second flexure bars;
wherein the flexure pattern passes completely through the wall thereby further defining a wall portion of the wall that is in addition to the member, the wall portion is located adjacent to each side of the member so as to surround the member and the flexure pattern, and flexing of the member produces a movement of the optical/imaging component.

2. The apparatus of claim 1, wherein:
the first flexure bar is defined by
   a first pair of parallel cuts formed adjacent to one another without overlapping/intersecting,
   a first pair of holes formed adjacent one another without overlapping/intersecting, thereby defining the first flexure point there between, and
   a second pair of holes formed adjacent one another without overlapping/intersecting, thereby defining a third flexure point there between,
   wherein the first and second pairs of holes are provided at opposing ends of the first pair of parallel cuts such that one end of the first flexure bar tapers into the first flexure point and another end of the first flexure bar tapers into the third flexure point; and
the second flexure bar is defined by
   a second pair of parallel cuts formed adjacent to one another without overlapping/intersecting,
   a third pair of holes formed adjacent one another without overlapping/intersecting, thereby defining the second flexure point there between, and
   a fourth pair of holes formed adjacent one another without overlapping/intersecting, thereby defining a fourth flexure point there between,
   wherein the third and fourth pairs of holes are provided at opposing ends of the second pair of parallel cuts such that one end of the second flexure bar tapers into the second flexure point and another end of the second flexure bar tapers into the fourth flexure point.

3. The apparatus of claim 2, wherein:
the member is further defined by
   a first connecting cut which connects the first and third pairs of holes, and
   a second connecting cut which connects the second and fourth pairs of holes;
the first pair of parallel cuts is provided parallel to the second pair of parallel cuts; and
the first and second pairs of parallel cuts are substantially perpendicular to the first and second connecting cuts.

4. The apparatus of claim 1, wherein the flexing is at least one of one-dimensional, two-dimensional, and three-dimensional.

5. The apparatus of claim 1, wherein the movement assists with at least one of achieving and maintaining fine focus with the optical/imaging component.

6. The apparatus of claim 1, wherein the mechanism forms at least part of a housing configured to house at least a portion of the optical/imaging component.

7. The apparatus of claim 1, wherein the wall having the flexure pattern is a first wall having a first instance of the flexure pattern formed therein, and the mechanism further comprises:
   a second wall having a second instance of the flexure pattern formed therein; and
   a third wall operatively coupling the first and second walls such that the first and second walls are arranged parallel to one another, defining a gap there between, and such that the first instance of the flexure pattern formed in the first wall and the second instance of the flexure pattern formed in the second wall are in alignment with one another across the gap.

8. The apparatus of claim 7, wherein the gap is dimensioned to receive the optical/imaging component.

9. The apparatus of claim 7, wherein the first, second, and third walls define a unitary/continuous piece.

10. The apparatus of claim 7, wherein the first, second, and third walls comprise discrete pieces securely fastened together.

11. The apparatus of claim 7 further comprising:
   a third instance of the flexure pattern, wherein the third instance of the flexure pattern is formed in the first wall adjacent to the first instance of the flexure pattern, and wherein the third instance of the flexure pattern is rotated 180° as compared with the first instance of the flexure pattern; and
   a fourth instance of the flexure pattern, wherein the fourth instance of the flexure pattern is formed in the second wall adjacent to the second instance of the flexure pattern, and wherein the fourth instance of the flexure pattern is rotated 180° as compared with the second instance of the flexure pattern;
   wherein the third instance of the flexure pattern formed in the first wall and the fourth instance of the flexure pattern formed in the second wall are in alignment with one another across the gap.

12. The apparatus of claim 1 further comprising a drive assembly operatively coupled with the mechanism to cause flexing of the member to produce movement of the optical/imaging component.

13. An apparatus comprising:
   a mechanism comprising a wall having a flexure pattern passing completely through a thickness of the wall and that defines an elongated member formed therein and that further defines a wall portion of the wall that is in addition to the member, the wall portion is located adjacent to each side of the member so as to surround the member and the flexure pattern, and the member extending along a distance of the wall in a first direction and having first and second ends and being attached at only the first end via first and second flexure points, the member including
      a first flexure bar extending from the first flexure point and along the first direction,
      a second flexure bar extending from the second flexure point and along the first direction, and
      a mounting portion configured to receive an optical/imaging component, wherein the mounting portion is operatively coupled to the first flexure bar and the second flexure bar proximate to the second end of the member, wherein the mounting portion resides directly there between; and
   a drive assembly configured to be operatively coupled with the mechanism to cause flexing of the member to produce a movement of the optical/imaging component;
   wherein the movement assists with at least one of achieving and maintaining fine focus with the optical/imaging component.

14. The apparatus of claim 13, wherein the movement is in the range of about 1-400 µm or greater.

15. The apparatus of claim 13, wherein the drive assembly comprises:
   a drive bar operatively coupled with the optical/imaging component; and
   an actuator operatively coupled with the mechanism and configured to engage the drive bar to cause movement of the optical/imaging component relative to the mechanism.

16. The apparatus of claim 13, wherein the drive assembly comprises:
   a flexible drive bar operatively coupled with the optical/imaging component; and a piezoelectric drive motor configured to engage the flexible drive bar to cause movement of the optical/imaging component relative to the mechanism.

17. The apparatus of claim 13 further comprising a housing disposed proximate an exterior of the mechanism.

18. The apparatus of claim 17, wherein the drive assembly comprises:
a first driver operatively coupled with the housing and with the optical/imaging component, wherein the first driver is configured to cause movement of the optical/imaging component relative to the housing; and
a second driver operatively coupled with the housing and with the mechanism, wherein the second driver is configured to cause movement of the mechanism relative to the housing.

19. The apparatus of claim 18, wherein at least one of the first driver and the second driver comprises an actuator.

20. A system comprising:
a mechanism comprising a wall having a flexure pattern passing completely through a thickness of the wall and that defines an elongated member formed therein and that further defines a wall portion of the wall that is in addition to the member, the wall portion is located adjacent to each side of the member so as to surround the member and the flexure pattern, and the member extending along a distance of the wall in a first direction and having first and second ends and being attached at only the first end via first and second flexure points, the member including
a first flexure bar extending from the first flexure point and along the first direction,
a second flexure bar extending from the second flexure point and along the first direction, and
a mounting portion configured to receive an optical/imaging component, wherein the mounting portion is operatively coupled to the first flexure bar and the second flexure bar proximate to the second end of the member, wherein the mounting portion resides directly between the first and second flexure bars; and
a drive assembly configured to be operatively coupled with the mechanism to cause flexing of the member to produce a movement of the optical/imaging component;
wherein the movement is in the range of about 1-400 µm or greater and assists with at least one of achieving and maintaining fine focus with the optical/imaging component.

* * * * *